D. A. CLARK AND C. E. LOWE.
PROCESS OF MANUFACTURING MANDRELS FOR PNEUMATIC TIRES.
APPLICATION FILED JAN. 22, 1919.
1,316,273.
Patented Sept. 16, 1919.
3 SHEETS—SHEET 1.
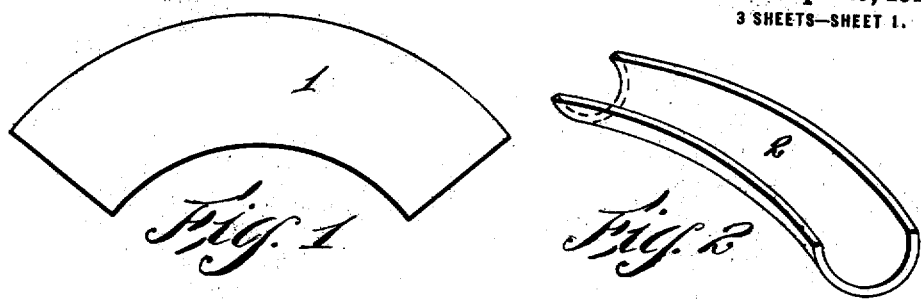
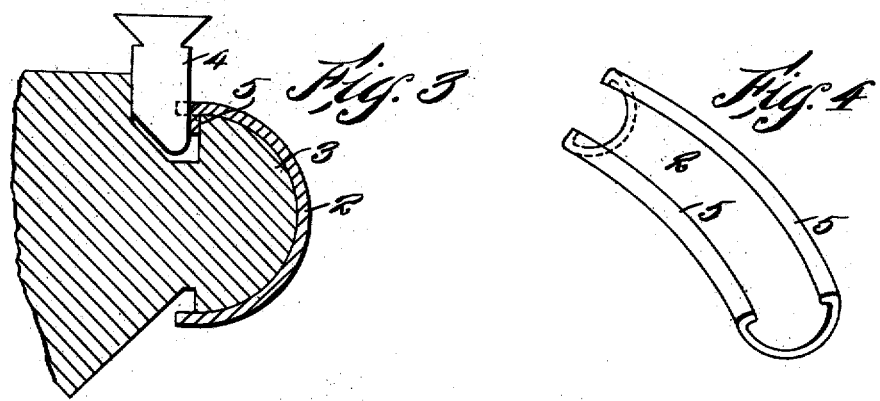
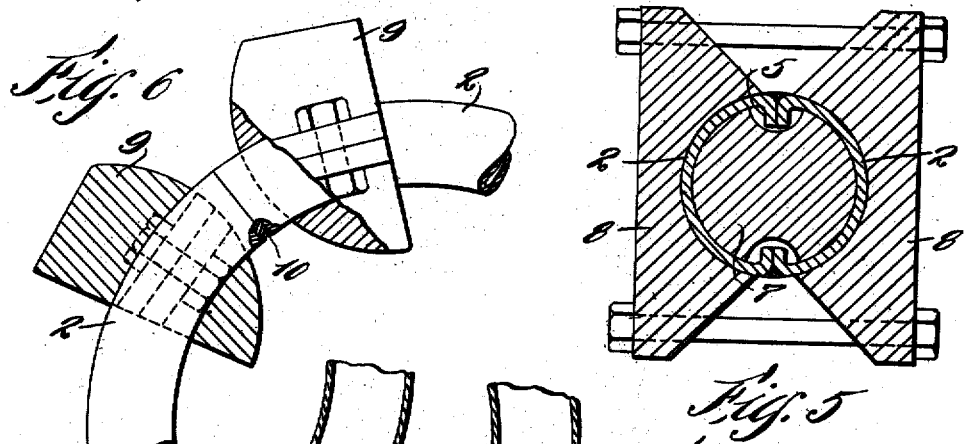
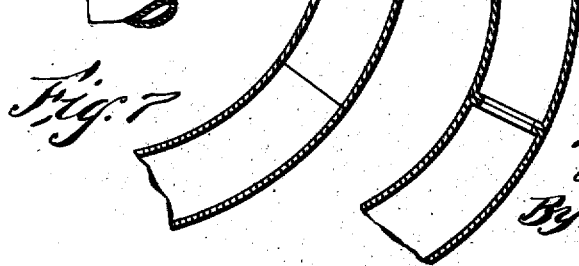

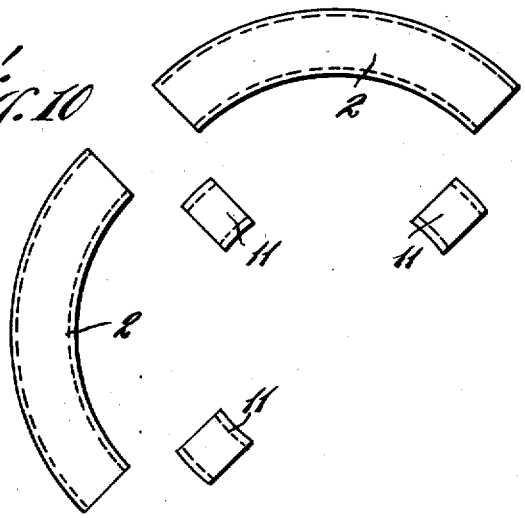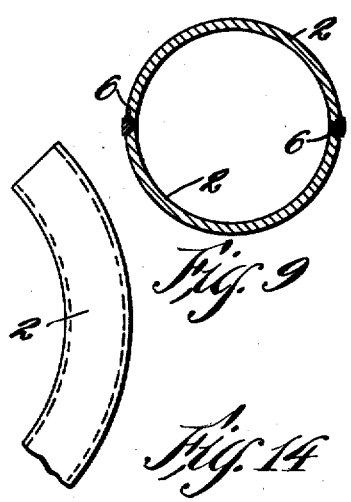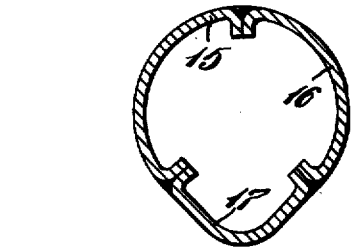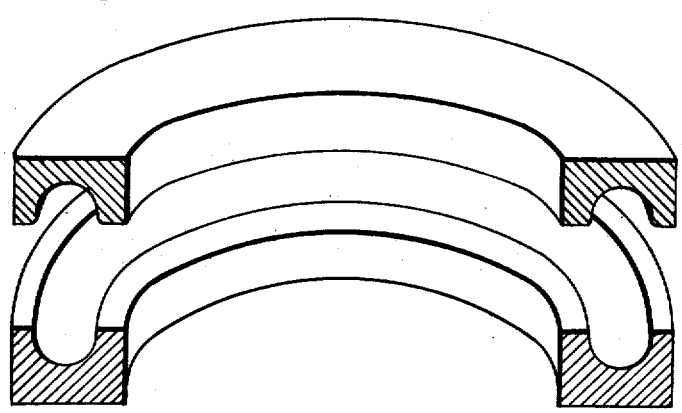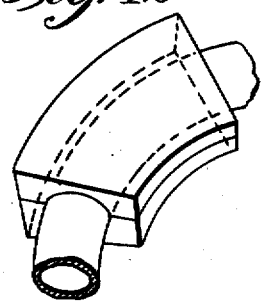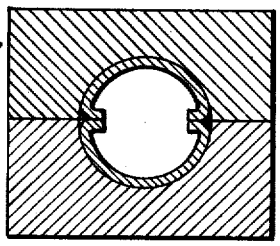

D. A. CLARK AND C. E. LOWE.
PROCESS OF MANUFACTURING MANDRELS FOR PNEUMATIC TIRES.
APPLICATION FILED JAN. 22, 1919.
1,316,273.
Patented Sept. 16, 1919.
3 SHEETS—SHEET 3.
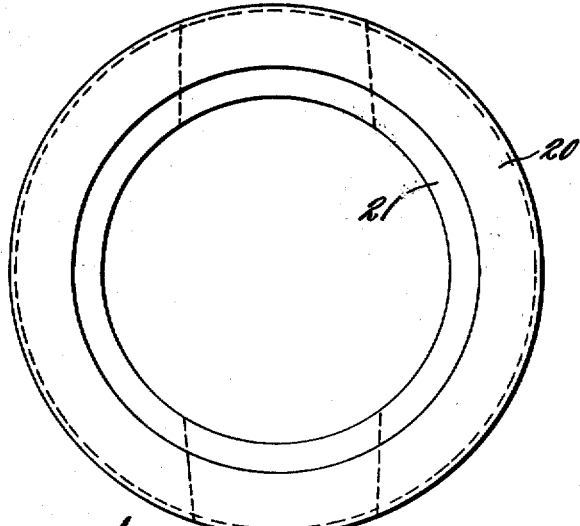
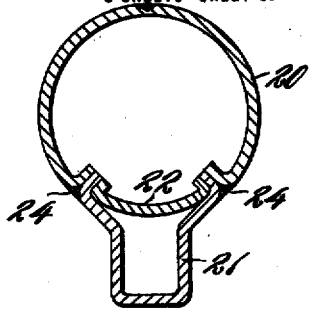
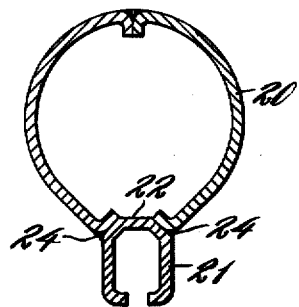
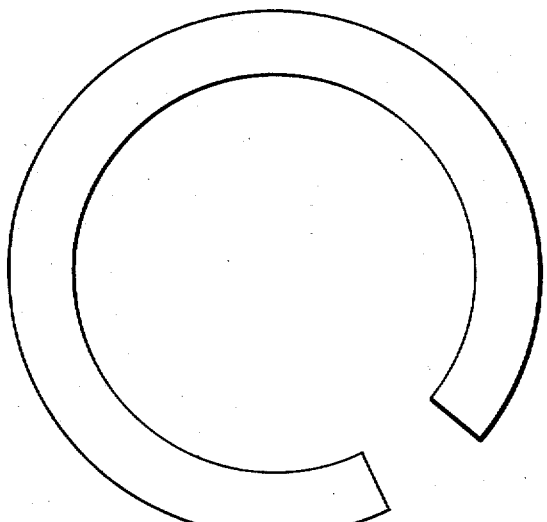
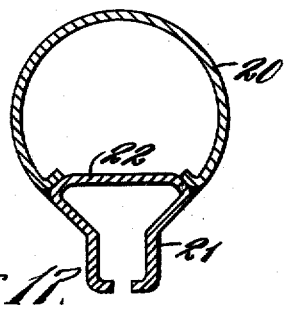

UNITED STATES PATENT OFFICE.

DON A. CLARK AND CLYDE E. LOWE, OF CLEVELAND, OHIO, ASSIGNORS TO THE CLYDE E. LOWE COMPANY, OF CLEVELAND, OHIO, A CORPORATION OF OHIO.

PROCESS OF MANUFACTURING MANDRELS FOR PNEUMATIC TIRES.

1,316,273.  Specification of Letters Patent.  Patented Sept. 16, 1919.

Application filed January 22, 1919. Serial No. 272,412.

*To all whom it may concern:*

Be it known that we, (1) DON A. CLARK, (2) CLYDE E. LOWE, citizens of the United States, residing at Cleveland, in the county of Cuyahoga and State of Ohio, have invented a certain new and useful Improvement in Processes of Manufacturing Mandrels for Penumatic Tires, of which the following is a full, clear, and exact description, reference being had to the accompanying drawings.

This invention relates to mandrels for use in the production of pneumatic tires and parts thereof, under which term we include not only the specific mandrels used for the fashioning of inner tubes, but also cores used in making casings and liners. The objects of the present invention are the provision of a new and improved process for the manufacture of these mandrels out of sheet metal; the provision of a new and improved process for securing and maintaining the requisite accuracy in the dimensions of devices of this nature; the provision of a new and ingenious construction of mandrel enabling its manufacture from sheet metal; while further objects and advantages will become apparent as this description proceeds.

It has long been the established practice to fashion the various parts of pneumatic tires, whether casings, liners, or inner tubes, upon mandrels or cores of the requisite shape. In order to obtain the necessary accuracy of shape and size, as well as the smooth and finished surface requisite to successful operation, these devices have generally been made of cast iron and turned to size in a boring mill, which is not only a very expensive operation but results in a heavy and unwieldy core. The requirements of accuracy, however, have permitted no other course since no known process existed whereby sheet metal could be used prior to our own inventions. The manufacture of mandrels of sheet metal reduces their cost very markedly, reduces their weight, enhances the speed of their production, decreases their heat capacity, and, when our process is followed, produces a device of the requisite accuracy of size and shape.

In the drawings accompanying and forming part of this application, we have shown our invention as embodied in certain physical forms along with certain illustrative steps of our improved process, although it will be understood that these drawings are not intended to limit us solely to those constructions or steps. In these drawings, Figure 1 represents a flat blank of sheet metal; Fig. 2 represents the same formed into a channel; Fig. 3 represents the step of trimming the edges of that channel; Fig. 4 shows the completed channel in one of its preferred forms; Fig. 5 illustrates the mode of securing two channels together to form a body; Fig. 6 illustrates the step of securing two bodies together in assembling a mandrel; Figs. 7 and 8 illustrate alternative forms to Figs. 6; Fig. 9 illustrates a construction alternative to Fig. 5; Fig. 10 illustrates the assembly of a complete mandrel; Figs. 11 and 12 illustrate alternative forms of shaping dies; and Fig. 13 a cross sectional view of such dies with a mandrel therein.

Fig. 14 is a cross sectional view of a reliner core; Figs. 15, 16 and 17 are sectional views of alternative forms of casing cores constructed in accordance with our invention; Fig. 18 is a plan view of a complete casing core; and Fig. 19 is a plan view of a complete tube mandrel.

Describing by reference characters the parts and steps illustrated in these drawings, we start with a flat curved blank 1 (Fig. 1) and by the use of a suitable punch and die well known to metal workers we form a channel member 2 (Fig. 2). The edges of this channel are rough and can be trimmed in either of two modes, either by turning the edges inwardly as shown in Figs. 3 and 4 or by shearing them smoothly away as shown in Fig. 9. This is done by supporting the member on an arbor 3 and subjecting its edges to the action of a punch 4, which if narrower than the slot which it enters and rounded at its end operates to bend the metal sharply inwardly as at 5; or if made sharp and of the same width as the slot acts as a shear. In either case, the punch is made rather narrow and reciprocated continuously, the member 2 being fed gradually past the same, first one side and then the other. The result is a member as shown in Fig. 4 or Fig. 9, although in the latter case the edges have been subjected to an added chamfering step (not shown) producing the sloping edges 6, which are desirable for providing a groove for receiving weld-metal. In the former case the rounded shoulder formed by the bend provides the desired space, while the flanges produce a bracing action which markedly increases the strength of the device. The welding is effected in any suitable manner as by an oxyhydrogen or oxyacetylene welding torch, additional metal such as soft steel being added so as to fill the groove and unite the members firmly together.

Two similar members are then clamped together as shown in Fig. 5 and welded. A mandrel 7 is preferably employed to absorb the heat and keep the metal from buckling; and it is well, but not imperative, that the clamp members 8, 8 be made of considerable longitudinal extent for the same reason.

A plurality of the arcuate hollow bodies thus produced are then assembled together end to end and welded together as shown in Fig. 6. Massive clamps 9, 9 are preferably employed to localize the heating and minimize the distortion and suitable inserts are preferably introduced such as the plates 10 (Fig. 6) or sleeves 11 (Fig. 10), to hold the bodies in line and reinforce their ends. Space for the weld-metal can be provided either by a slight separation of adjacent bodies (Fig. 6) or by chamfering their edges (Fig. 7) or by folding their margins inwardly (Fig. 8); the last named mode dispenses with the need for any separate reinforcement.

When the foregoing steps have been completed, the resulting device will be found to lack somewhat of complete accuracy owing to irregularities in alinement and also to the distortion produced by repeated local heating. But the material used is preferably a rather soft steel of considerable thickness, as for example $\frac{3}{32}$ to $\frac{1}{8}$ inch in thickness depending upon the size of the device; and the diameter of each body is purposely made slightly greater than that desired in the completed article. The device is then returned to the press and subjected to the action of finishing dies of the exact dimensions required, the same being operated with very great force whereby the elastic limit of the metal is exceeded and the same compressed to the exact dimensions desired. Such dyes are shown in Figs. 11 and 12, the former constituting a complete circle and the latter only a small segment thereof, but both having the cross section of the completed article. On the score of accuracy of product and rapidity of manufacture the former type is preferable and in some cases essential; while on the score of press capacity the latter is preferable and can be used where accuracy in circular shape and strict uniformity of plane are not imperative. For example, mandrels for inner tubes are generally discontinuous as shown in Fig. 19 to allow of the removal of such tube, and while reasonable accuracy of diameter of the body is required, accuracy of the diameter of the entire circle need be only approximate, and reasonable variations from plane are permissible; for such cases, the dies shown in Fig. 12 are desirable, the mandrel being advanced therethrough step by step. Mandrels for casings and liners, however, must have a much higher degree of accuracy in total diameter and adherence to plane, and for such the dies shown in half section in Fig. 11 are essential or at least highly desirable.

In Fig. 14 we have shown the cross section of a reliner core constructed in accordance with our invention. In this embodiment the body is made of three members 15, 16, 17, two alike and one different, the parts being formed and secured together in any of the modes above described, and constituting a complete circle as shown in full lines in Fig. 18. It is not necessary that the members be of exactly the shape shown or that they be three in number, but only that the exterior surface have no reëntrant angles.

In Figs. 15, 16, and 17 we have shown certain constructions of keyhole core, which may be made by our improved process. Each of these constitutes a complete circle as shown in Fig. 18, being either integral as shown in full lines or severed into sections as shown by the dotted lines. It is characteristic of this type of core that the same comprises a torus shaped body 20 having at its inner side a continuous rectangular rib 21; and it is essential only that the interior of the body adjacent to the rib be bridged by a metal web 22 to take up the compression pressure and prevent a mere bending. In the device shown in Fig. 15, the body part is formed of two similar side members, formed as previously described, with their inner edges welded to a sheet metal rib of the cross section shown the bridge member consisting of a separate piece and the weld seams 24, 24 being located slightly outside the rib.

In the form shown in Fig. 16, the body part is made as in Fig. 15 except that the weld seams are formed at the base of the rib, and the bridge 22 is integral with the rib channel. The device shown in Fig. 17 has a body portion made in one piece and the rib member has a broadened base welded thereto, the bridge being integral. Many other forms can be devised. In all cases the device is first made slightly larger than desired for the finished article and compressed to exact shape and size by striking in a finishing die, preferably of the complete circular type shown in Fig. 11.

While we have described our invention in detail, it will be understood that many changes and variations can be made both in form and process within the purview of our patent rights. The new articles of manufacture herein described are reserved for a separate application.

Having thus described our invention, what we claim is:—

1. The process of making a pneumatic tire mandrel, which includes the steps of first forming a hollow curvilinear sheet metal body having the transverse circumference of the metal body greater than that of the finished core, and afterward compressing the metal to the desired circumference simultaneously with shaping the exterior to the finished form.

2. The process of making a pneumatic tire mandrel, which includes the steps of first forming a plurality of curvilinear sheet metal channel pieces, second, welding a plurality of these pieces together to form a curvilinear sheet metal body having the transverse circumference of the metal body greater than that of the finished core, and afterward compressing the metal to the desired circumference and form and overcoming the welding strains by the application of pressure greater than the elastic limit of the metal.

3. The process of making tire mandrels which includes the steps of first forming a hollow curvilinear sheet metal body having the interior dimensions and transverse circumference both greater than that of the finished mandrel, and afterward compressing the metal in arcuate forming dies having the exact shape and size desired, employing a pressure greater than the elastic limit of the metal.

4. The process of making a tire mandrel which contains the steps of first, forming from a sheet of metal a curvilinear channel member having the approximate shape of a portion of the completed mandrel, the transverse periphery of such member being greater than that of the corresponding portion of the finished mandrel, second, welding a plurality of channel member together at the edges to form arcuate hollow bodies, and third, compressing said bodies in finishing dies to reduce them to the desired size and overcome the distortion produced by the heating.

5. The process of making pneumatic tire mandrels which includes the steps of forming curvilinear sheet metal channel members inclining the edges of those members, assembling different members together to form arcuate hollow bodies with such inclined edges forming grooves, filling said grooves with weld-metal whereby the members are secured together and a substantially smooth outer surface produced, securing a plurality of bodies together end to end, and finally compressing the device in a finishing die whereby the same is brought to the exact size and shape desired.

6. The process of making pneumatic tire mandrels which includes the steps of forming curvilinear sheet metal channel members, bending inwardly the margins of such members, whereby stiffening flanges are formed and a sloping edge produced, assembling different members together to form arcuate bodies with their sloping edges forming grooves, filling such grooves with weld-metal whereby the members are secured together and a substantially smooth surface produced, and securing a plurality of such bodies together end to end to produce a substantially circular mandrel.

7. The process of making pneumatic tire mandrels which includes the steps of forming curvilinear sheet metal channel members, inclining the edges of those members, assembling different members together to form arcuate hollow bodies with such inclined edges forming grooves, filling said grooves with weld-metal whereby the members are secured together and a substantially smooth outer surface produced, inclining the end margins of such bodies, applying massive, heat-absorbing clamps thereto, assembling such bodies end to end so that their sloped end margins shall produce grooves, filling such grooves with molten weld-metal whereby the bodies are held together and the grooves filled, and finally compressing the bodies in a finishing die whereby the welding strains are overcome.

8. The process of making pneumatic tire mandrels, which includes the steps of forming curvilinear sheet metal channels, assembling together a plurality of channels to form hollow bodies, welding the longitudinal joints of said bodies, assembling together end to end a plurality of such bodies to form a substantially circular whole, while defining narrow circumferential grooves between adjacent bodies, filling such grooves with molten weld-metal whereby the bodies are secured together and a substantially smooth surface produced, and finally compressing the entire device in finishing dies, the bodies being originally made slightly larger than the size desired and the pressure employed being greater than the elastic limit of the metal.

In testimony whereof, we hereunto affix our signatures.

DON A. CLARK.
CLYDE E. LOWE.